Nov. 10, 1970 J. N. HALL 3,539,670
METHOD OF FORMING HOLLOW PLASTIC ARTICLES
Filed March 29, 1968

JOHN N. HALL
INVENTOR.

BY *Edward L. Bell*

ATTORNEY

3,539,670
METHOD OF FORMING HOLLOW
PLASTIC ARTICLES
John N. Hall, Brookside Park, Newark, Del., assignor to Hercules Incorporated, Wilmington, Del., a corporation of Delaware
Filed Mar. 29, 1968, Ser. No. 717,084
Int. Cl. B29c *17/07*
U.S. Cl. 264—99                                                     2 Claims

ABSTRACT OF THE DISCLOSURE

This invention relates to a method of blow molding articles of biaxially oriented plastic material and comprises a two-step process in the first of which a parison is formed and axially oriented, and in the second of which the uniaxially oriented parison is fixed in a clamp, heated to its orientation temperature, placed in a mold and blown to its final form while simultaneously orienting the material circumferentially.

---

The present invention relates to a method of forming hollow plastic articles and particularly to a method of forming such articles of biaxially oriented polymeric material. The hollow articles to which the present invention is directed are primarily bottles and will, for convenience, be referred for the most part hereinafter as bottles although it will be understood that the invention is not limited to making bottles and that other hollow articles are within the scope of the invention.

Blow molding has heretofore been used to make bottles of thermoplastic materials. It has also heretofore been recognized that the physical properties such as tensile strength, impact resistance and clarity of thermoplastic materials can be significantly improved by orientation of the material. Various efforts have been made to produce bottles of oriented thermoplastic materials by blow molding, examples of which may be seen in the Wiley Pat. No. 3,288,317 and the Heider Pat. No. 3,311,684. However, in all of the known prior art methods difficulties are experienced in achieving production rates that are sufficiently high to be commercial. One of the difficulties presented is that, in order to effect orientation in a thermoplastic material such as polypropylene, the material must be substantially crystalline and at its orientation temperature, which is usually only slightly below its melt temperature at the time of orientation. Crystallization occurs very slowly at elevated temperatures, and the usual practice therefore is to cool the extruded product, for example, the tube, to a lower temperature where crystallization proceeds rapidly, and then to reheat the same to an orientation temperature. Because the heat conductivity of the plastic material is very poor, a great deal of time is required to obtain the proper conditions for orientation. This requires a cycle time in the method of Heider that is prohibitively long, or an equally slow cycle or an excessively long conditioning apparatus in the method of Wiley.

There is also known in the prior art a so-called two-stage process for making bottles of plastic materials such as polyvinyl chloride by blow molding. In this process, the parison is extruded, cooled, and cut to length in a first stage. The cut lengths are then transported to a blowing operation where, in a second stage, they are reheated to a working temperature, and enclosed in a mold and blown. There are numerous advantages in such a process over a conventional blow molding operation wherein the molten parison from the extruder is enclosed directly in a mold and blown. By way of example, an advantage of the latter process is that the production of parisons at a single location provides for mass production in which the technical and commercial advantages produce maximum economy and efficiency. A further advantage is that minimum capital investment and technical proficiency is required at the blowing site which can be located at an "in-plant" operation. Another advantage is that, in contrast to the blown bottle, the parison provides for minimum shipping volume and expense. The so-called two-stage process also avoids the problems presented by attempting to match the production rates of a parison-forming and a bottle-forming operation, as well as the problems of the loss of production of an entire line if it becomes necessary to shut-odwn either the parison-forming or bottle-forming operation. This latter problem of course is aggravated if it is the bottle-forming operation that breaks down because recycling the polymer in the extruder causes degradation of it. There is also flexibility in a two-stage operation in that different colors or different materials can be readily substituted whereas changing colors or materials in an extruder is difficult and time consuming.

Another problem presented in the prior art processes is in achieving the desired wall thickness, particularly in relatively small neck bottles. With a parison that is of uniform cross section and without a pinching of the parison, the material made available for forming the body portion of the bottle is substantially the same as that for forming the smaller neck portion. The neck portion thus constitutes a limitation on the size of the parison whereas the material thus made available for the body portion of the bottle may not be adequate to provide sufficient wall thickness or if it is sufficiently thick at this portion, there is an excess of material in the neck portion of the bottle and the neck is therefore too rigidly to form properly or is too thick and must be reamed. Minimum wall thickness consistent with strength requirements is desired not only to reduce the amount and thus the cost of the polymer but also to reduce the weight of the bottle and thus the work and expense involved in handling and in shipping it.

The objects of this invention are to provide a method of making bottles from oriented plastic materials, which method is capable of being operated at commercial production rates, is economical to operate and will produce uniform high quality bottles with a minimum of material and which bottles are therefore relatively inexpensive and light weight, and which have improved physical properties associated with biaxially oriented plastic materials. It is also an object of this invention to provide a two-stage process for making oriented plastic bottles in which there is a minimum of scrap to be returned from the bottle-forming operation to the parison-forming operation.

Briefly, the method of this invention comprises a first step in which a tube of thermoplastic polymeric material in crystalline condition is axially oriented and used in formation of a parison, and a second step in which the parison is fixed in a clamp, heated to its orientation temperature and circumferentially oriented by blow molding. One of the features of the invention is the endwise drawing of the tube in formation of the parison, thus reducing the external diameter of the tube and providing a parison whose external diameter is as large as possible in relation to the minimum diameter portion of the mold, which is usually at the neck.

With the above and other objects in view, the present invention is hereinafter described with reference to the accompanying drawings, in which.

Figure 1:
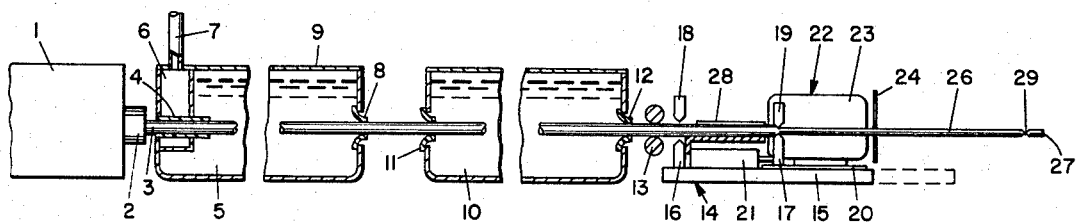
FIG. 1 is a schematic illustration of an apparatus for practicing the parison-forming operation of the process in accordance with this invention.

With reference to the drawings, there is illustrated schematically in FIG. 1 an extruder 1 having a die 2 from which is extruded a tube 3 of a thermoplastic material, such as polypropylene, in a molten condition. The tube 3 is melt drawn to a certain extent and then enters a perforated sizing die 4 mounted in a quench tank 5. The die 4 is surrounded by a vacuum chamber 6 connected by a conduit 7 to a source of vacuum (not shown), which, in conjunction with atmospheric pressure that is introduced to the bore of the tube 3 through the internal mandrel of the die 2, expands the tube 3 against the surface of the die 4 and against which it is cooled and set. By way of example, the sized and cooled tube may be about three-fourths of an inch in diameter with a central bore one-fourth inch in diameter and a wall thickness of one-fourth inch.

From the die 4, the tube 3 passes into the liquid in the quench tank 5 and out of the tank through an exit seal 8. To minimize the problem of providing effective sealing, the tank 5 may be closed by a cover 9 and a vacuum drawn above the liquid, which can be provided for example by opening the vacuum chamber 6 to the air space above the liquid. The tank 5 is sufficiently long so that by the time the tube 3 has arrived at the exit end, it will have been cooled to a temperature at which crystallization occurs rapidly. With a polypropylene tube, that temperature may be for example, about 120° C. The period of time required to cool the tube depends not only upon the temperature differential between the tube and the cooling medium, but also upon the thickness of the walls of the tube and the period of time that it is immersed in the liquid in the quench tank 5, which of course, in turn, depends upon the speed at which the tube is advanced and upon the length of the tank 5.

From the quench tank 5, the cooled and crystalline tube 3 passes through a reheating tank 10 which has an inlet seal 11 and an outlet seal 12 and, like the tank 5, may also be under a vacuum in order to improve sealing. Within the tank 10, the tube 3 is reheated to its orientation temperature, that is, for polypropylene, to a temperature of about 160° C. In order to minimize the amount of reheating that is required, the tube is cooled in the quench tank 5 to no more than the maximum temperature at which crystallization occurs rapidly, that is, for example, about 100° C.

In the illustrated form, the tube 3 is advanced by a pair of puller rolls 13 disposed at the outlet side of the reheating tank 10 and which impose a tension on the tube 3. The work required of the puller rolls 13 may be reduced by an additional pair of feed rolls (not shown) disposed for example between the tanks 5 and 11. Reducing the work required of the puller rolls 13 reduces the possibility that they will mar the surface of the tube 3, which marring would normally appear as imperfections in the finished bottle.

Figure 2:
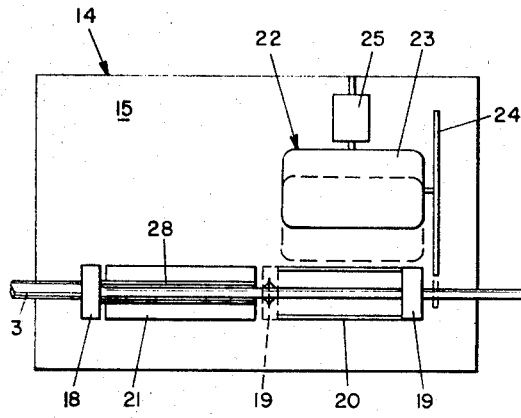
FIG. 2 is a plan view somewhat schematically of the axial orientation portion of the apparatus shown in FIG. 1.

Axial or endwise orientation is imparted to the tube 3 by a drawing apparatus 14. In the form illustrated in FIGS. 1 and 2, the drawing apparatus 14 comprises a carriage 15 mounted for reciprocation in a path aligned with the axis of the tube 3 and adapted to be driven through an advance stroke in which it moves with the tube 3 and a relatively fast return stroke in the opposite direction.

Mounted on the carriage 15 are the lower jaws of a fixed clamp 16 and a movable clamp 17. The clamps 16 and 17 include upper jaws 18 and 19 respectively, each of which is adapted to open to receive the tube 3 and to close to secure the tube in the clamp. In addition to clamping the tube securely, each of the clamps 16 and 17 are designed to pinch the tube 3 and thereby close the bore thereof and preferably to seal the bore closed. With the tube at its orientation temperature and thus relatively soft, it can be readily pinched and, with relatively sharp tube engaging edges that concentrate the clamping forces along pinch lines, sufficient pressure can be developed to effect sealing of the tube at the temperature involved. In order to draw the tube 3 endwise after it is seized by the clamps 16 and 17 and while the drawing apparatus is advanced with the tube 3, the movable clamp 17 is mounted in a guideway 20 on the carriage 15 for reciprocating movement endwise of the axis of the tube 3, and is driven for example by a hydraulic actuator 21 mounted on the carriage 15.

There is also mounted on the carriage 15 a cutter 22 which includes a motor 23 having a cutting blade 24 on the shaft thereof. The motor 23 is mounted for example on a rocking support to adapt the same to be shifted laterally of the carriage 15 into and out of a cutting position relative to the tube 3 and is moved by a hydraulic actuator 25 between its inoperative position as illustrated in full lines in FIG. 2 and its operative or cutting position as illustrated in dotted lines in FIG. 2. When the cutter 22 is advanced, the blade 24 severs the tube 3 adjacent to the movable clamp 17 which is then in its forward or drawn position to sever from the tube 3 a parison 26 at a cut end 27.

In making the parisons 26, the carriage 15 is initially at rest at the end of its return stroke and the upper jaws 18 and 19 of the clamps are open. The tube 3, including the unsevered parison 26 that was drawn in the previous cycle, is advanced from the reheating tank 10 as for example by the puller rolls 13 and the leading or cut end 27 thereof moves outwardly, or to the right in FIGS. 1 and 2. Since the undrawn portion of the tube 3 is at its orientation temperature and thus quite soft, there may be provided an upwardly-open support 28 carried by the fixed clamp 16. The tube 3 is advanced until the pinch line 29 formed by the clamp 16 in the previous cycle is aligned with the clamp 17 which is then at rest at the end of its return stroke. The upper jaws 18 and 19 of the clamps 16 and 17 are then closed simultaneously onto the tube 3 with the clamp 16 pinching the tube flat to form a new pinch line 29 and closing the bore, and with the clamp 17 closing onto the pinch line 29 formed on the previous cycle. In operation, the previously formed pinch line 29 can be used for sensing the position of the tube 3 to initiate an actuating element (not shown) that closes the clamps 16 and 17.

The advance strokes of the carriage 15 and of the movable clamp 17 are initiated as soon as the clamps 16 and 17 are closed, the advance movement of the carriage 15 being synchronized with the advance of the tube 3 while the advance movement of the clamp 17 is at a relatively rapid rate to impart endwise elongation to the section of the tube 3 disposed between the clamps 16 and 17. Upon completion of the advance stroke of the movable clamp 17, the cutter 22 is actuated to sever the tube adjacent the clamp 17 and thereby form the parison 26. When the drawn section of the tube between the clamps 16 and 17 has cooled sufficiently to become set, which may be expedited by a water spray, the clamps 16 and 17 are opened, the clamp 17 moves through its return stroke, and the cycle is repeated. After severing, the parison 26 may be passed directly to the subsequent operation or may be collected for storage or shipment, all of which may of course be provided manually or by suitable handling equipment.

Figure 3:
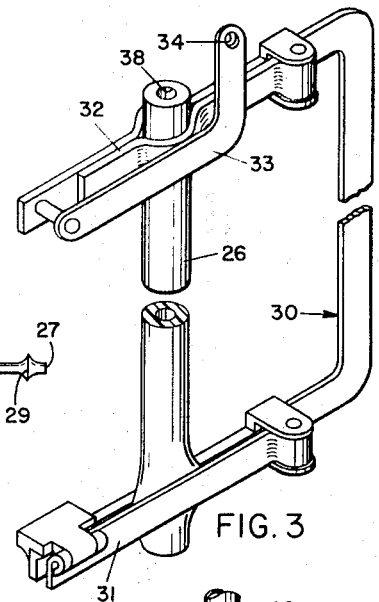
FIG. 3 is a perspective view of a parison and retaining means in which the parison is mounted during the bottle-forming operation.
Figure 4:
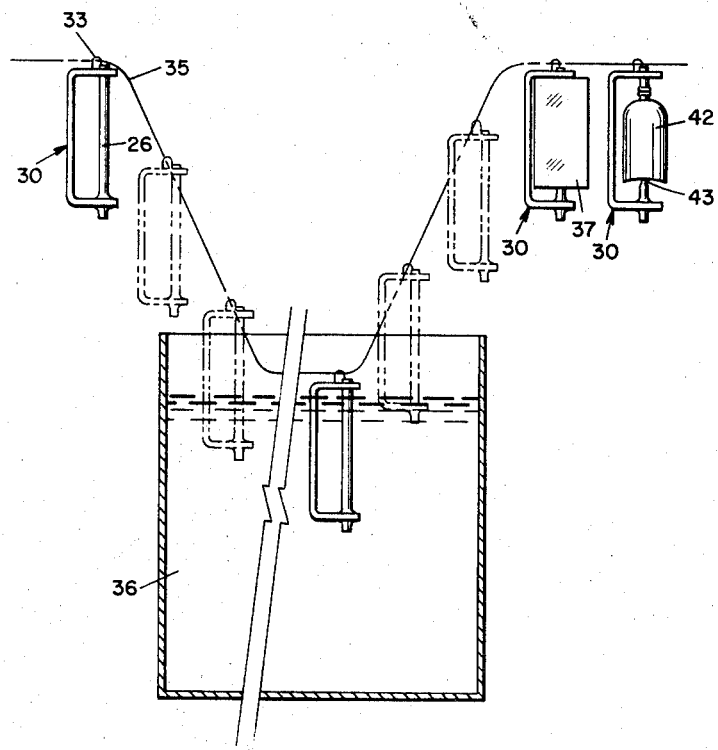
FIG. 4 is a schematic illustration of apparatus for practicing the bottle-forming operation of the process in accordance with this invention.
Figure 5:
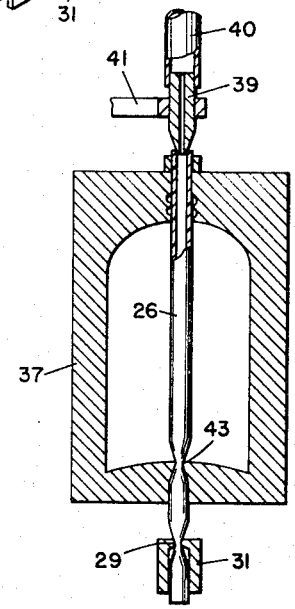
FIG. 5 is a sectional view substantially centrally of the mold during the bottle-forming operation.

In a subsequent bottle-forming operation, the parison 26 is reheated to its orientation temperature, enclosed in a mold, and blown to form a bottle. In FIG. 4, there is illustrated schematically an apparatus for practicing this process, which apparatus includes restraining means in the form of a bracket 30 in which the parison 26 is secured to prevent the same from shrinking endwise. The bracket 30 as shown in FIG. 3 is substantially C-shaped and has a clamp 31 at its lower end that is adapted to be swung between a closed and an open position and to be releasably latched in its closed position, and which, in its closed position, seizes the parison at the pinch line 29. At its upper end, the bracket 30 has a clamp 32 that, together with the upper arm of the bracket, encircles the tube and is held in its closed position by a cam type latch having a latch arm 33. The clamp 32 is designed to clamp the upper end of the parison securely without crushing the side wall or closing the bore thereof. The bracket 30 includes means such as an aperture 34 in the latch arm 33 for suspending the same with the parison therein from a chain that is schematically illustrated at 35. The chain 35 is indexed periodically to advance a succession of the brackets 30 stepwise along a path that leads through a reheating bath 36 to a molding position where it is enclosed between the opposed halves of a mold 37. In passing through the reheating bath 36, the major portion of the parison is immersed in a heating fluid to provide an article-forming section that is heated to its orientation temperature, while the portion of the parison enclosed by the clamp 32 remains above the bath to provide a relatively unheated clamping section. The pinch at the pinch line 29 serves at this time to close the end of the parison 26 and thus prevents the heating medium from entering and contaminating the inside of the same.

At the blowing position, a blowing fluid is introduced into the parison 26 through the bore 38 thereof by means of a nozzle 39 that is connected by a conduit 40 to a source of blowing fluid, for example, air under pressure. The nozzle 39 is carried by an arm 41 that is adapted to force the same downwardly with the leading end thereof in the bore 38 of the parison and with a substantially fluid-tight connection about the edge of the bore. After the bottle is blown and cooled, the mold 37 is opened, and the bottle 42, together with the unused portions of the parison 26, is removed from the mold and the bracket 30 is removed. Thereafter, the bottle is finished by trimming at both the pinch line 43 formed by the mold 37 and at the neck and, if necessary, reaming the neck to open the same to the desired diameter.

One of the specific advantages of endwise orienting the parisons 26 in the parison forming operation in accordance with this invention is that the bottle forming operation then requires only the re-heating and blowing of the parison and trimming of the completed bottle. Thus, a minimum of equipment and of technical knowledge is required for the blowing operation, which can be located remotely from the parison forming operation such as at an "in-plant" site. While this requires a return shipment of scrap, there are significant advantages obtained in the economies and efficiencies obtained in the shipment of the pre-oriented parisons, rather than the completed bottles from the parison forming site. Alternatively, if the parison forming and bottle blowing operations were combined at an "in-plant" site, it would require a significantly greater investment in equipment and knowhow and, since the bottle production would be limited to the plant requirements, there would be lost the efficiencies and economies that are obtained by mass production. A further advantage of the present process is the flexibility that is achieved by the production of pre-oriented parisons whereby different colors and blends of materials can be processed through the bottle-forming operation with a minimum of adjustments. While the invention specifically contemplates endwise orientation of the parison in the parison-forming operation, it will be apparent that the broader aspects of the invention include the use of the parison in the as-extruded condition with the axial and circumferential orientation performed as continuous steps in the bottle-forming operation.

Because the portion of the parison that is secured in the clamp 32 is relatively unheated, it remains quite rigid and can be readily held with sufficient force to prevent slipping as the parison tends to contract when heated to its orientation temperature, and without crushing the parison and thereby closing its bore. At the same time, the nozzle 39 can be held against the open end of the parison with sufficient force to provide a fluid tight seal with the parison without causing the parison to slip relative to the clamp. With the blowing fluid introduced in this fashion maximum blowing efficiency is obtained since the blowing fluid is introduced and exhausted through a passage having a diameter that is substantially at a maximum, that is, the diameter of the bore 38, and, in contrast to blowing with a needle, there is no possibility of deflection of the needle in penetrating a relatively thick wall, which deflection could prevent the needle from intersecting the bore 38.

A further problem in making oriented bottles is to achieve optimum wall thicknesses throughout a bottle having significant variations in its internal diameter such as in the neck and in the body of the bottle. The wall thickness of the parison must be sufficient to provide the desired wall thickness in the bottle at the portion of maximum diameter, that is, the portion expanded the most during the blowing operation, without providing excess material in the reduced diameter portions of the bottle. At the same time, the maximum diameter of the parison at the time the mold is closed must be small enough to be received within the minimum diameter of the mold cavity if pinching of the parison is to be avoided. The bore of the parison must also be sufficiently large to provide for convenient connection to the source of blowing fluid and for a relatively rapid blowing of the bottle and exhaust of the fluid. In accordance with this invention, the parison is drawn axially and thus partially oriented before the mold is closed, and, since the diameter of the parison is thus reduced, the parison can be of a diameter that is initially larger than the minimum diameter of the mold cavity and is reduced in drawing to the desired diameter. In contrast to a process wherein both the endwise and the circumferential orientation are both effected in the mold, bottles can be made in accordance with the method of this invention with a neck that is small relative to the diameter of the body portion of the bottle without pinching the parison at the neck and without making a bottle having a wall in the body portion that is too thin for the desired strength or rigidity.

It is also believed that pre-orienting the parison endwise before it is blown and restraining the same against shrinkage at the time it is blown also contributes to a more uniform distribution of the material and balancing of the orientation in the finished bottle. There is also a substantially uniform distribution of heat throughout the parison and a more accurate temperature at the time it is blown since the parison is heated to its orientation temperature at the time of blowing, with the result that the material draws more easily and uniformly. Oriented polypropylene bottles have been produced in accordance with the method of this invention with a ratio of four-to-one between the diameters of the body portion and the neck, and with a surprisingly uniform wall thickness throughout most of the body portion of the bottle. The bottles have the usual properties associated with oriented polypropylene, that is, high tensile strength, rigidity and impact resistance, particularly improved impact resistance at cold temperatures. The bottles are also very clear although the clarity is to a certain extent a function of the purity and smoothness of the original parison and the marring of the parison in handling.

What I claim and desire to protect by Letters Patent is:

1. A method of forming a hollow plastic article from a crystallizable thermoplastic polymeric material comprising:

(a) extruding said material in molten condition in the form of tubing;

(b) cooling said tubing to effect crystallization of the polymeric material;
(c) reheating said tubing to an orientation temperature;
(d) pinching and drawing said tubing endwise while at orientation temperature to effect axial orientation;
(e) cooling and severing the drawn tubing adjacent to the pinch-off to form a parison;
(f) restraining said parison against longitudinal shrinkage by securing said parison in a restraining means including a clamping means secured to the open end of the parison;
(g) reheating said parison to orientation temperature while secured in said restraining means to provide a heated article-forming lower section in said parison and an unheated upper section including the open end of the parison and the clamping means secured thereto;
(h) closing a mold on the heated article-forming section of said parison while effecting a pinch-off adjacent to the end of the heated section remote from the clamping means;
(i) introducing a blowing fluid through the bore of the open end of the parison to expand the heated section of the parison to conform to the mold cavity and to effect circumferential orientation thereof; and
(j) opening the mold after the expanded heated section has cooled to setting temperature and removing and finishing the article.

2. The method of claim 1 in which the introduction of the blowing fluid is effected by a nozzle inserted into the bore of the open end of the parison and pressed against said open end to provide a substantially fluid-tight connection.

References Cited
UNITED STATES PATENTS

| | | | |
|---|---|---|---|
| 2,919,462 | 1/1960 | Friden | 264—99 |
| 3,202,739 | 8/1965 | Zavasnik | 264—94 X |
| 3,294,885 | 12/1966 | Cines et al. | 264—99 |

ROBERT F. WHITE, Primary Examiner

T. J. CARVIS, Assistant Examiner

U.S. Cl. X.R.

18—5